United States Patent Office 2,802,850
Patented Aug. 13, 1957

2,802,850

HYDROPHOBIC SILICAS

John W. Wetzel, Pittsfield, Mass., assignor to General Electric Company, a corporation of New York No Drawing. Application November 1, 1954,
Serial No. 466,225

3 Claims. (Cl. 260—448.2)

This invention is concerned with hydrophobic silicas and methods of preparing the same. More particularly, the invention relates to the preparation of hydrophobic silicas obtained by hydrolyzing a lower alkyltrichlorosilane, e. g., methyltrichlorosilane, ethyltrichlorosilane, etc., in an aqueous-oil (i. e., water-in-oil) emulsion containing an alkali-metal silicate, and thereafter isolating the finely divided silica particles formed as a result of this reaction.

Finely divided silica fillers have found eminent use in the preparation of greases and as fillers for various elastomeric materials, particularly as fillers for silicone rubber. However, one of the difficulties in using the finely divided silica fillers heretofore available is the fact that they are moisture-sensitive so that when incorporated, for instance, in a vulcanizable silicone rubber, and the latter cured, the vulcanized product tends to pick up undesirable amounts of moisture which leads to inferior electrical properties and, in many respects, reduction in some of the physical properties of the cured materials. I have now discovered a means for making finely divided silicas which are hydrophobic in character, that is, they are affected little, if any, by moisture and can be readily incorporated in the above-described greases and silicone rubbers to give moisture-resistant products.

In accordance with my invention, I first form a water-oil emulsion containing an alkali-metal silicate, for example, sodium silicate, potassium silicate, etc., and add to the said emulsion an organic solution containing an alkyl trichlorosilane, e. g., methyltrichlorosilane. This mixture of ingredients is then allowed to react whereby hydrolysis of the methyltrichlorosilane takes place with concurrent reaction of the hydrolysis product with the silicic acid formed from the acidification of the alkali metal silicate. This results in finely divided silica particles which contain silicon-bonded methyl groups which lend hydrophobic properties to the silica particles.

In making the emulsion of the alkali-metal silicate, it is usually desirable to employ a viscous hydrocarbon oil such as a mineral oil, paraffin oil, albolene, etc., and to add an emulsifying agent to the latter and, while vigorously mixing the oil, for instance, in a Waring Blendor, to add an aqueous solution of the alkali-metal silicate preferably with a small amount of an alkali-metal hydroxide, such as sodium hydroxide, until intimate dispersion of the alkali-metal silicate and water has taken place and emulsification has occurred. The amount of water used may range in weight from about 0.01 to 1 part thereof per part of oil used.

The amount of oil used, which is preferably a hydrocarbon oil of a viscosity ranging from about 25 to 3000 centipoises, may be varied widely depending on the type of oil used, the proportion of alkali-metal silicate to be emulsified therein, the amount of water used for emulsification purposes, etc. In general, relating the proportion of alkali-metal silicate to oil, the alkali-metal silicate may comprise from about 5 to 25 percent of the weight of the oil. The amount of water used for emulsification purposes may also be varied within fairly wide ranges but is advantageously equal to about 5 to 25 percent of the weight of the oil, taking into consideration the amount of water used to make the alkali-metal silicate solution. It should be noted that unexpectedly if less viscous hydrocarbon oils are used, the size of the particles will be much coarser and thus of little utility, particularly as fillers for silicone rubber.

Any of the emulsifying agents well known in the art may be employed as, for example, soaps, various oleates, the Tritons manufactured by Rohm & Haas, the Tweens; other emulsifying agents, such as trimethylbenzylammonium chloride, amide condensation products of fatty acids with organic amines ("Pluramine S-100" sold by the Kearny Manufacturing Company, Inc., Kearny, New Jersey), morpholine oleate, etc. In general, the amount of emulsifying agent required is extremely small and no more than a few drops are necessary for obtaining the desired emulsification.

The alkali-metal silicate used in making the emulsion to which the methyltrichlorosilane will be added is preferably in the form of an aqueous solution, of which about 10 to 50 percent thereof is the alkali-metal silicate. An additional amount of water is advantageously added in an amount equal to about 0.1 to 5 percent of the weight of the oil at the time the alkali-metal solution is incorporated. Small amounts of an alkali-metal hydroxide are advantageously employed if the total alkali present is insufficient to neutralize the acid formed from the hydrolysis of the alkyltrichlorosilane.

The methyltrichlorosilane is preferably employed in the form of a dilute organic solution, for instance, in a high boiling solvent, that is, those boiling above 80° C. as, for instance, mixtures of various hexanes, heptanes, octanes, etc. Although aliphatic hydrocarbon solvents are preferred, the use of inert organic solvents, such as halogenated hydrocarbons, aromatic hydrocarbons, etc., as solvents for the methyltrichlorosilane, is not precluded.

In general, the concentration of the methyltrichlorosilane in the solvent may vary widely but preferably is within the range of from about 3 to 15 percent, by weight, based on the weight of the total solution.

The manner of incorporating the methyltrichlorosilane solution in the water-oil emulsion is relatively simple. One method comprises stirring a mixture of the oil and the emulsifying agent rapidly in a Waring Blendor, and while stirring, slowly adding the aqueous solution of the alkali-metal silicate together with a small amount of alkali-metal hydroxide and additional water employed for ease of operation. After allowing the mixture to stir until complete emulsification has taken place, the solution of alkyltrichlorosilane in the solvent is added slowly to the vortex of the stirred emulsion. Stirring is continued until complete integration of the ingredients is accomplished and, if necessary, the emulsion is treated with small amounts of, for instance, hydrochloric acid, to insure that the final mixture has a pH of below 7, for instance, a pH from about 3.5 to 6. Thereafter, the mixture is filtered and the solid particles thus obtained are preferably washed with additional solvent to remove unreacted organic materials using such solvents as polyhydric alcohols, ether, benzene, acetone, petroleum hydrocarbons such as petroleum spirits, etc. The finely divided silica is advantageously washed with water to remove inorganic salts present, and then dried under vacuum at around room temperature and finally in a circulating air oven to give the desired product.

In order that those skilled in the art may better understand how the present invention may be practiced, the following example is given by way of illustration and not by way of limitation.

*Example 1*

About 400 cc. of a heavy white mineral oil (Nujol) was stirred rapidly in a Waring Blendor together with about 3 drops of a non-ionic emulsifying agent, specifically Triton X–100 (condensation product of phenol and ethylene oxide sold by Rohm and Haas). To the vortex of this stirred mixture was added a semi-viscous solution composed of 27.9 grams of N–Brand sodium silicate (containing about 38 percent, by weight, sodium silicate, the remainder water, the said sodium silicate being sold by Philadelphia Quartz Co. and more particularly described in U. S. Patent 2,561,304—Hazel, issued July 17, 1951), 0.4 gram sodium hydroxide and 1.7 grams water. The addition of the sodium silicate solution was made slowly until complete emulsification had taken place. To this emulsion was added a solution of 4.44 grams of methyltrichlorosilane in about 63 grams of 2,2,4-trimethylpentane over a period of about 9 minutes into the vortex of the reaction mixture being stirred at the maximum blender speed. As the methyltrichlorosilane solution was added, the temperature rose gradually to about 65 to 70° C. and it remained there throughout the addition. After the final addition, the emulsion was allowed to stir for an additional 5 minutes and after this period of time about 2 to 3 cc. concentrated hydrochloric acid was added to adjust the pH of the final mixture on the acid side. The mixture was filtered and the solid product obtained was stirred with 500 cc. petroleum ether, again filtered and given four washes with ligroin. The precipitate was then further washed twice with 500 cc. portions of acetone and twice more with 500 cc. portions of ligroin. The solid particles thus obtained were washed with water until they were substantially free of inorganic salts, dried under vacuum at room temperature and finally dried in an air circulating oven at 75° C. This material had a bulk density of 0.394 gram/cc. and was hydrophobic.

It will, of course, be apparent to those skilled in the art that other hydrocarbon oils, as well as other alkali-metal silicates, may be used in making the above-described finely divided hydrophobic silicas. As will be apparent to those skilled in the art, the conditions may be modified and the proportions of ingredients varied, preferably within the ranges recited previously.

The hydrophobic silica particles obtained in accordance with the above description can be used as fillers for silicone rubber (in amounts equal, by weight, to from 10 to 100 percent of the total weight of the latter and the convertible organopolysiloxane) to give cured products, in the presence of curing agents, which show reduced sensitivity to moisture and improved electrical characteristics. They can also be used as fillers for greases to give materials which are very little affected by changes in humidity.

What I claim as new and desire to secure by Letters Patent of the United States is:

1. The process for forming a finely divided hydrophobic silica containing silicon-bonded lower-alkyl groups which comprises (1) forming a water-oil emulsion of a hydrocarbon oil of between 25 to 3,000 centipoise viscosity with an aqueous solution of an alkali-metal silicate in such proportion that the alkali-metal silicate comprises from 5 to 25 percent, by weight, of the weight of the oil, and the total water in the emulsion is also equal to from 5 to 25 percent, by weight, of the weight of the oil, (2) adding a 3 to 15 percent weight solution of a lower alkyltrichlorosilane to the stirred emulsion of (1) so as to effect hydrolysis and cocondensation of the chlorosilane and silicate, and (3) filtering the mixture to remove the finely divided silica containing the silicon-bonded lower alkyl groups.

2. The process as in claim 1 in which the alkali metal silicate is sodium silicate.

3. The process for forming a finely divided hydrophobic silica containing silicon-bonded methyl groups which comprises (1) forming a water-oil emulsion of a hydrocarbon oil of between 25 to 3,000 centipoise viscosity with an aqueous solution of sodium silicate in such proportion that the sodium silicate comprises from 5 to 25 percent, by weight, of the weight of the oil, and the total water in the emulsion is equal to from 5 to 25 percent, by weight, of the weight of the oil, (2) adding a 3 to 15 percent weight solution of methyltrichlorosilane to the stirred emulsion of (1) so as to effect hydrolysis and cocondensation of the chlorosilane and silicate, and (3) filtering the mixture to remove the finely divided silica containing the silicon-bonded methyl groups.

References Cited in the file of this patent

UNITED STATES PATENTS

| | | |
|---|---|---|
| 2,269,059 | McLachlan | Jan. 6, 1942 |
| 2,588,853 | Kumins et al. | Mar. 11, 1952 |
| 2,608,495 | Barry | Aug. 26, 1952 |
| 2,676,182 | Daudt et al. | Apr. 20, 1954 |
| 2,715,060 | Barry | Aug. 9, 1955 |
| 2,751,366 | Braendle | June 19, 1956 |